(12) United States Patent
Surek et al.

(10) Patent No.: US 8,155,148 B2
(45) Date of Patent: Apr. 10, 2012

(54) TELECOMMUNICATIONS TRANSPORT METHODS AND SYSTEMS FOR THE TRANSPARENT MAPPING/DEMAPPING OF CLIENT DATA SIGNALS

(75) Inventors: Steven Arvo Surek, Leonardo, NJ (US); Michael Scott Brown, Baltimore, MD (US)

(73) Assignee: Ciena Corporation, Linthicum, MD (US)

( * ) Notice: Subject to any disclaimer, the term of this patent is extended or adjusted under 35 U.S.C. 154(b) by 936 days.

(21) Appl. No.: 11/236,026

(22) Filed: Sep. 27, 2005

(65) Prior Publication Data
US 2007/0071033 A1    Mar. 29, 2007

(51) Int. Cl.
*H04J 3/24*          (2006.01)
*H04J 3/02*          (2006.01)

(52) U.S. Cl. ........ 370/474; 370/464; 370/338; 370/539; 375/240.26; 375/316; 375/359

(58) Field of Classification Search .................. 370/474, 370/464, 476, 338, 240.01, 314, 310, 345, 370/401, 466, 539, 471, 360, 382, 506; 375/316, 375/340, 354, 355, 359, 240.26; 380/49, 380/50; 710/20, 56, 36
See application file for complete search history.

(56) References Cited

U.S. PATENT DOCUMENTS

| | | | | |
|---|---|---|---|---|
| 5,835,602 A * | 11/1998 | Lang | ............................. | 380/268 |
| 5,936,948 A * | 8/1999 | Sicher | ........................... | 370/314 |
| 6,122,281 A * | 9/2000 | Donovan et al. | ............. | 370/401 |
| 6,680,938 B1 * | 1/2004 | Hammermeister et al. | .. | 370/360 |
| 6,831,932 B1 * | 12/2004 | Boyle et al. | ................... | 370/539 |
| 2001/0055342 A1 * | 12/2001 | Fimoff | ..................... | 375/240.26 |
| 2002/0037019 A1 * | 3/2002 | Heuer | .......................... | 370/539 |
| 2003/0137975 A1 * | 7/2003 | Song et al. | ..................... | 370/353 |
| 2005/0089084 A1 * | 4/2005 | Mahany | ........................ | 375/130 |
| 2006/0062329 A1 * | 3/2006 | Chua | .............................. | 375/316 |
| 2006/0104348 A1 * | 5/2006 | Chen et al. | ............... | 375/240.01 |
| 2007/0268881 A1 * | 11/2007 | Moorti et al. | ................. | 370/338 |

\* cited by examiner

*Primary Examiner* — Aung S Moe
*Assistant Examiner* — Jamal Javaid
(74) *Attorney, Agent, or Firm* — Clements Bernard PLLC; Christopher L. Bernard; Lawrence A. Baratta, Jr.

(57) ABSTRACT

The present invention provides telecommunications transport methods and systems for the transparent mapping/demapping of client data signals without the insertion/deletion of idle characters for client data signal rate adaptation. These methods and systems include mapping an incoming client data signal to and demapping an outgoing client data signal from a transport frame comprising: a first segment that is dedicated to client data; a second segment that is dedicated to fixed stuff, wherein the fixed stuff comprises, for example, network management information; a third segment that is dedicated to justification data for supporting a client data signal rate adaptation function; and a fourth segment that is dedicated to justification control information for indicating whether the third segment is used for client data or fixed stuff, wherein the justification control information is redundant for error protection purposes.

15 Claims, 6 Drawing Sheets

D = Client Data, S = Fixed Stuff, C = Justification Control, J = Justification Data

| | Col 1 | ... | Col J | Col J+1 | ... | Col K | Col K+1 | Col K+2 | Col K+3 | ... | Col L | Col L+1 | ... | Col M | Col M+1 | Col M+2 |
|---|---|---|---|---|---|---|---|---|---|---|---|---|---|---|---|---|
| Row 1 | D | .. | D | S | .. | S | C | J | D | .. | D | S | .. | S | C | J |
| Row 2 | D | .. | D | S | .. | S | C | J | D | .. | D | S | .. | S | C | J |
| Row 3 | .. | .. | .. | .. | .. | .. | .. | .. | .. | .. | .. | .. | .. | .. | .. | .. |
| Row N | D | .. | D | S | .. | S | C | J | D | .. | D | S | .. | S | C | J |

D = Client Data, S = Fixed Stuff, C = Justification Control, J = Justification Data

TELECOMMUNICATIONS TRANSPORT METHODS AND SYSTEMS FOR THE TRANSPARENT MAPPING/DEMAPPING OF CLIENT DATA SIGNALS

FIELD OF THE INVENTION

The present invention relates generally to telecommunications transport methods and systems for the transparent mapping/demapping of client data signals. More specifically, the present invention relates to telecommunications transport methods and systems for the transparent mapping/demapping of client data signals without the insertion/deletion of idle characters.

BACKGROUND OF THE INVENTION

Client data signals, such as Gigabit Ethernet (GigE), Fibre Channel (FC), Enterprise Systems Connection (ESCON), International Business Machines InterSystem Channel-2/3 (IBM ISC-2/3) client data signals, and the like, are typically transported over telecommunications transport networks, such as Synchronous Digital Hierarchy/Synchronous Optical Networks (SDH/SONETs), Optical Transport Networks (OTNs), and the like, in one of two ways: 1) data frames are recovered from an incoming client data stream by terminating and stripping inter-frame information and encapsulating the data frames within some other protocol for transport, such as Point-to-Point Protocol (PPP), High-Level Data Link Control Protocol (HDLC), Generic Framing Procedure-F Protocol (GFP-F), or the like; or 2) the raw client data stream including the inter-frame information is re-encoded into an encapsulating protocol for transport, such as Generic Framing Procedure-T Protocol (GFP-T) or the like. Once the client data signal has been transported across the network, it is recovered from the encapsulating protocol. In both cases, rate adaptation of the outgoing client data stream, which is typically clocked by a local oscillator, is performed using a process involving idle character insertion/deletion. The method of insertion/deletion of idle characters is specific to the type of client data stream involved.

The methods described above suffer from the following shortcomings. The first method is not fully transparent because the inter-frame information is terminated and stripped prior to encapsulation. This creates problems for some client data signals that make use of the inter-frame information for management or other purposes. The second method is transparent but suffers from error multiplication occurring within the encapsulating protocol. For example, a multiple bit error within a GFP-T superblock results in the loss of 64 code words. Additionally, both methods perform rate adaptation of the outgoing client data signal through the insertion/deletion of idle characters specific to each client data signal type. This requires application-specific functions that increase complexity. Some client data signals, such as IBM ISC-2/3 client data signals, are not publicly standardized and the insertion/deletion of idle characters may cause improper operation. For such client data signals, a method for the transparent mapping/demapping of client data signals that does not rely on the insertion/deletion of idle characters for the rate adaptation of the outgoing client data signal is desirable.

BRIEF SUMMARY OF THE INVENTION

In various exemplary embodiments, the present invention provides telecommunications transport methods and systems for the transparent mapping/demapping of client data signals (data services) without the insertion/deletion of idle characters for client data signal rate adaptation. The mapping/demapping techniques provided may be applied to any fixed-rate transport container (frame) that is used to carry an incoming client data signal, such as a Synchronous Digital Hierarchy Virtual Container-4 (SDH VC-4), Synchronous Optical Network Synchronous Transport Signal-1 (SONET STS-1), Optical Transport Network Optical Channel Payload Unit-1 (OTN OPU-1) frame, or the like. The payload portion of the transport frame is divided into four functional segments: Segment 1 is dedicated to client data; Segment 2 is dedicated to "fixed stuff" (unused payload bytes within the container); Segment 3 is dedicated to justification data for the purpose of supporting a client data signal rate adaptation function (either dummy data or client data, the choice of which is controlled by the information in Segment 4); and Segment 4 is dedicated to justification control information that is used to indicate whether Segment 3 is used for dummy data or client data. The amount of the payload portion of the container that is used for client data (Segment 1) and the amount of the payload container that is used for fixed stuff (Segment 2) are dependent upon the ratio of the nominal client data rate and the nominal container data rate. The amount of the payload container that is used for justification data (Segment 3) is dependent upon the relative variations of the client data rate and the container data rate due to clock tolerances and clock frequency drift. The amount of the payload container that is used for justification control information (Segment 4) is dictated by the amount of information necessary to control the choice of client data or fixed stuff of Segment 3. Segments are not required to be contiguous within the container, but may be distributed in a manner convenient for client data signal mapping and that meets end-to-end data transport requirements. That is, the structure of the container may vary in a manner specific to the requirements of the client data signal that is being mapped.

In one exemplary embodiment of the present invention, a telecommunications transport method for the transparent mapping/demapping of client data signals without the insertion/deletion of idle characters for client data signal rate adaptation includes mapping an incoming client data signal to and demapping an outgoing client data signal from a transport frame comprising: a first segment that is dedicated to client data; a second segment that is dedicated to fixed stuff; a third segment that is dedicated to justification data for supporting a client data signal rate adaptation function; and a fourth segment that is dedicated to justification control information for indicating whether the third segment is used for client data or fixed stuff.

In another exemplary embodiment of the present invention, a telecommunications transport method for the transparent mapping/demapping of client data signals without the insertion/deletion of idle characters for client data signal rate adaptation includes mapping an incoming client data signal to and demapping an outgoing client data signal from a transport frame comprising: a first segment that is dedicated to client data; a second segment that is dedicated to fixed stuff, wherein the fixed stuff comprises network management information; a third segment that is dedicated to justification data for supporting a client data signal rate adaptation function; and a fourth segment that is dedicated to justification control information for indicating whether the third segment is used for client data or fixed stuff, wherein the justification control information is redundant for error protection purposes.

In a further exemplary embodiment of the present invention, a telecommunications transport system for the transparent mapping/demapping of client data signals without the insertion/deletion of idle characters for client data signal rate adaptation includes, at an ingress end, a Clock & Data Recovery block for recovering a client data signal and an associated client clock from an incoming data signal; a Write Clock for writing the client data signal into a first in, first-out (FIFO) storage element; and a Read Clock generated by a Mapper block for reading the client data signal out of the FIFO at a rate controlled by the Read Clock, wherein the Read Clock is a gapped payload container clock, and wherein the gapping of the payload container clock is controlled by a Fill Status indication from the FIFO. The Mapper block inserts the client data signal into a payload container and performs justification operations based upon the Fill Status indication, thereby performing a client-to-payload container rate adaptation.

In a still further exemplary embodiment of the present invention, a telecommunications transport system for the transparent mapping/demapping of client data signals without the insertion/deletion of idle characters for client data signal rate adaptation includes, at an egress end, a Demapper block for interpreting information in a payload container, outputting client data, and generating a Write Clock by gapping a payload container clock, wherein the Write Clock is used to clock data into a first-in, first-out (FIFO) storage element. Interpreting information in the payload container includes, among other things, determining which information is data (data columns and justification data columns when the justification control indicates that they contain valid data) and which is fixed stuff (fixed stuff columns and justification data columns when the justification control indicates that they contain fixed stuff). The system also includes a Clock Recovery block that is driven by the Write Clock from the Demapper block. The Clock Recovery block comprises a phase-locked loop that generates a periodic output clock from the gapped input of the Write Clock. The output clock is used as a Read Clock for the FIFO, which causes the client data to be clocked out of the FIFO at a regular rate, the same rate that the client data was clocked into an input FIFO in the Mapper block.

BRIEF DESCRIPTION OF THE DRAWINGS

The present invention is illustrated and described herein with reference to the various drawings, in which like reference numbers denote like method steps and/or system components, and in which.

DETAILED DESCRIPTION OF THE INVENTION

In various exemplary embodiments, the present invention provides telecommunications transport methods and systems for the transparent mapping/demapping of client data signals (data services) without the insertion/deletion of idle characters for client data signal rate adaptation. The mapping/demapping techniques provided may be applied to any fixed-rate transport container (frame) that is used to carry an incoming client data signal, such as a Synchronous Digital Hierarchy Virtual Container-4 (SDH VC-4), Synchronous Optical Network Synchronous Transport Signal-1 (SONET STS-1), Optical Transport Network Optical Channel Payload Unit-1 (OTN OPU-1) frame, or the like. The payload portion of the transport frame is divided into four functional segments: Segment 1 is dedicated to client data; Segment 2 is dedicated to "fixed stuff" (unused payload bytes within the container); Segment 3 is dedicated to justification data for the purpose of supporting a client data signal rate adaptation function (either dummy data or client data, the choice of which is controlled by the information in Segment 4); and Segment 4 is dedicated to justification control information that is used to indicate whether Segment 3 is used for dummy data or client data. The amount of the payload portion of the container that is used for client data (Segment 1) and the amount of the payload container that is used for fixed stuff (Segment 2) are dependent upon the ratio of the nominal client data rate and the nominal container data rate. The amount of the payload container that is used for justification data (Segment 3) is dependent upon the relative variations of the client data rate and the container data rate due to clock tolerances and clock frequency drift. The amount of the payload container that is used for justification control information (Segment 4) is dictated by the amount of information necessary to control the choice of client data or fixed stuff of Segment 3. Segments are not required to be contiguous within the container, but may be distributed in a manner convenient for client data signal mapping and that meets end-to-end data transport requirements. That is, the structure of the container may vary in a manner specific to the requirements of the client data signal that is being mapped. An exemplary payload container 10 is illustrated in FIG. 1.

Figure 1:
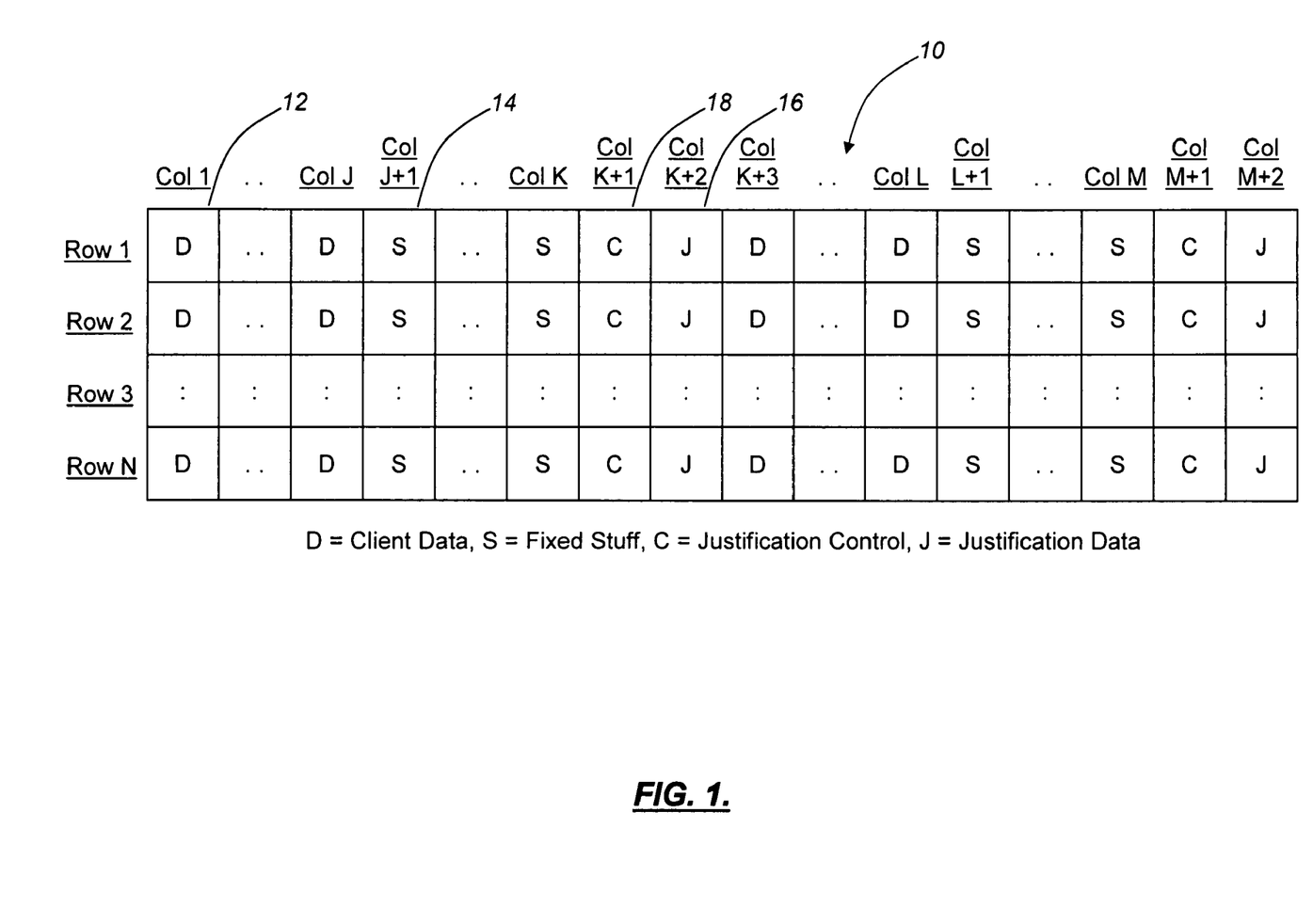
FIG. 1 is a schematic diagram illustrating one exemplary embodiment of a payload container of the present invention, the payload container including Segments 1-4 described above.
Figure 2:
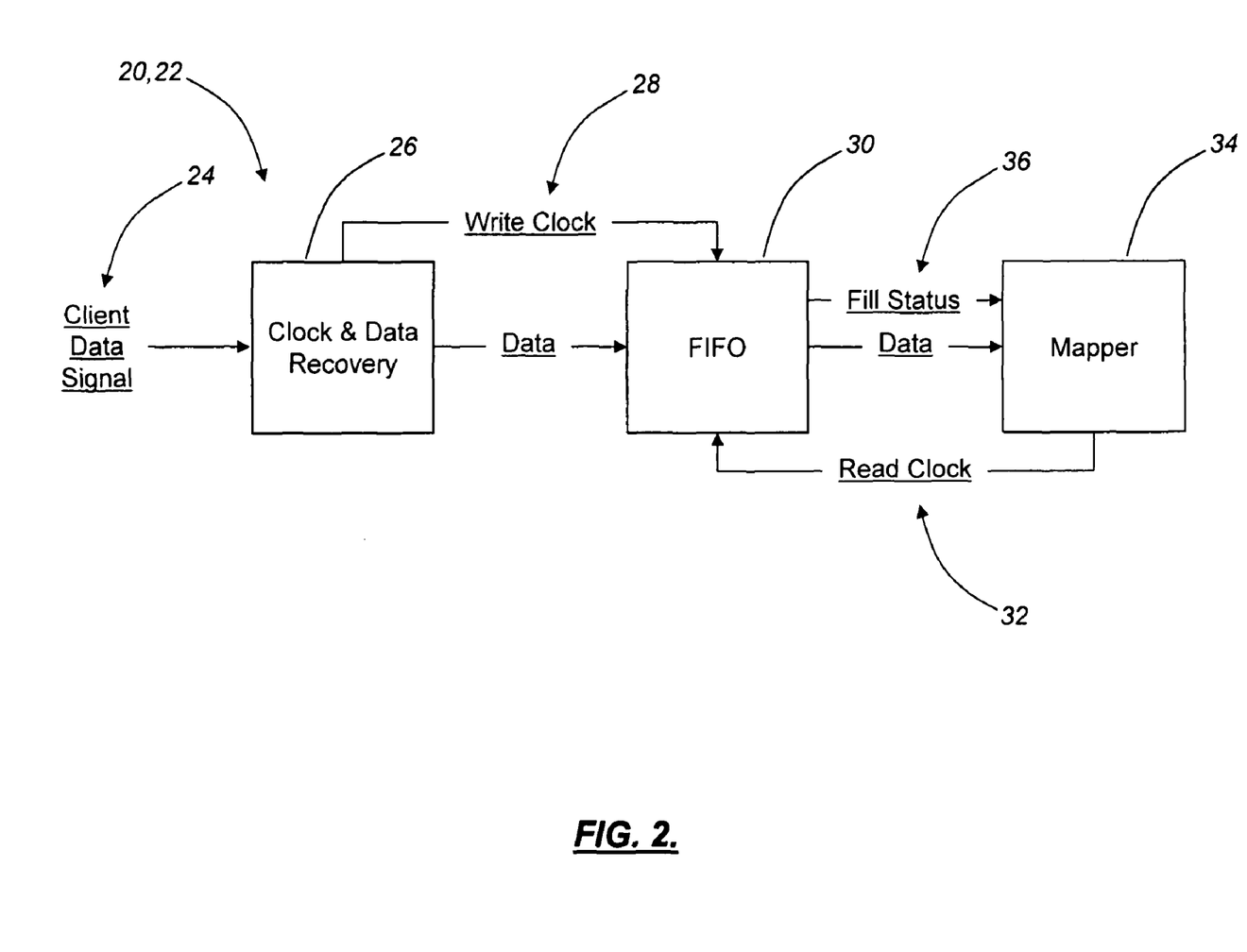
FIG. 2 is a schematic diagram illustrating one exemplary embodiment of the ingress end of the telecommunications transport system of the present invention, the ingress end including a Clock & Data Recovery block, a first in, first-out (FIFO) storage element, a Mapper block, a Write Clock, and a Read Clock.

Referring to FIG. 1, in one exemplary embodiment of the present invention, the elements marked as D represent portions of Segment 1 12, the elements marked as S represent portions of Segment 2 14, the elements marked as J represent portions of Segment 3 16, and the elements marked as C represent portions of Segment 4 18. Each element could be a single bit of information or, alternatively, multiple bits of information (including byte or multi-byte information). Two exemplary frame structures contemplated by the methods and systems of the present invention are described below and the process of mapping the client data signal into the payload container 10 is illustrated in FIG. 2.

A transport frame for ISC-2/3C mapping includes an 1172 column block and 10 ISC-2/3C repeat blocks. The 1172 column block includes 28 S (fixed stuff—Segment 2 14 (FIG. 1)) columns of transport overhead and 1144 D (client data—Segment 1 12 (FIG. 1)) columns of data bytes. The format of each of the ISC-2/3C repeat blocks is provided in Table 1 (where OFC refers to Open Fibre Control Bytes, NJO refers to a negative justification, and PJO refers to a positive justification).

TABLE 1

An OPVC1-7 Frame for ISC-2/3C Mapping

| | | |
|---|---|---|
| 1172 column block | 28 S columns | 2 OFC columns |
| | | 24 S columns |
| | | 2 C columns |
| | 1144 D columns | 1144 D columns |
| 1172 column block | 28 S columns | 2 OFC columns |
| | | 24 S columns |
| | | 2 C columns |
| | 1144 D columns | 1144 D columns |
| 1172 column block | 28 S columns | 2 OFC columns |
| | | 24 S columns |
| | | 2 C columns |
| | 1144 D columns | 1144 D columns |
| 1172 column block | 30 S columns | 2 OFC columns |
| | | 26 S columns |
| | | 2 NJO columns |
| | 1142 D columns | 2 PJO columns |
| | | 1140 D columns |
| 1172 column block | 28 S columns | 2 OFC columns |
| | | 26 S columns |
| | 1144 D columns | 1144 D columns |
| 1172 column block | 28 S columns | 2 OFC columns |
| | | 24 S columns |
| | | 2 C columns |
| | 1144 D columns | 1144 D columns |
| 1172 column block | 28 S columns | 2 OFC columns |
| | | 24 S columns |
| | | 2 C columns |
| | 1144 D columns | 1144 D columns |
| 1172 column block | 28 S columns | 2 OFC columns |
| | | 24 S columns |
| | | 2 C columns |
| | 1144 D columns | 1144 D columns |
| 1172 column block | 30 S columns | 2 OFC columns |
| | | 26 S columns |
| | | 2 NJO columns |
| | 1142 D columns | 2 PJO columns |
| | | 1140 D columns |

A transport frame for ISC-3P mapping includes a 2344 column block and 10 ISC-3P repeat blocks. The 2344 column block includes 56 S (fixed stuff—Segment 2 14 (FIG. 1)) columns of transport overhead and 2288 D (client data—Segment 1 12 (FIG. 1)) columns of data bytes. The format of each of the ISC-3P repeat blocks is provided in Table 2 (where NJO refers to a negative justification and PJO refers to a positive justification).

TABLE 2

An OPVC1-14 Frame for ISC-3P Mapping

| | | |
|---|---|---|
| 2344 column block | 56 S columns | 54 S columns |
| | | 2 C columns |
| | 2288 D columns | 2288 D columns |
| 2344 column block | 56 S columns | 54 S columns |
| | | 2 C columns |
| | 2288 D columns | 2288 D columns |
| 2344 column block | 56 S columns | 54 S columns |
| | | 2 C columns |
| | 2288 D columns | 2288 D columns |
| 2344 column block | 60 S columns | 56 S columns |
| | | 4 NJO columns |
| | 2284 D columns | 4 PJO columns |
| | | 2280 D columns |
| 2344 column block | 56 S columns | 56 S columns |
| | 2288 D columns | 2288 D columns |
| 2344 column block | 56 S columns | 54 S columns |
| | | 2 C columns |

TABLE 2-continued

An OPVC1-14 Frame for ISC-3P Mapping

| | | |
|---|---|---|
| | 2288 D columns | 2288 D columns |
| 2344 column block | 56 S columns | 54 S columns |
| | | 2 C columns |
| | 2288 D columns | 2288 D columns |
| 2344 column block | 56 S columns | 54 S columns |
| | | 2 C columns |
| | 2288 D columns | 2288 D columns |
| 2344 column block | 60 S columns | 56 S columns |
| | | 4 NJO columns |
| | 2284 D columns | 4 PJO columns |
| | | 2280 D columns |

Referring to FIG. 2, at the ingress end 22 of the transport system 20 the client data signal 24 and the associated client clock are recovered from the incoming data signal by the Clock & Data Recovery block 26. The recovered client clock is used as a Write Clock 28 to write the data into a first in, first-out (FIFO) storage element 30. Data is read out of the FIFO 30 at a rate controlled by a Read Clock 32 that is generated by the Mapper block 34. The Read Clock 32 is a gapped payload container clock. The gapping of the payload container clock is controlled by the Fill Status indication 36 from the FIFO 30. For example, when the FIFO detects that its fill status has exceeded a high threshold, it signals a high indication to the Mapper block 34. In general, the FIFO 30 is capable of supporting an arbitrary number of thresholds and signaling a separate indication for each one.

The Mapper block 34 inserts the client data signal 24 into the payload container 10 (FIG. 1), performs the justification operations based upon the Fill Status indication 36 (this is the process that performs the client-to-payload container rate adaptation), and generates the Read Clock 32. As data positions (the D positions of Segment 1 12 (FIG. 1)) occur, the Mapper block 34 generates a clock pulse on the Read Clock 32, which clocks client data out of the FIFO 30 and into the corresponding data position of the payload container 10. As fixed stuff positions (the S positions of Segment 2 14 (FIG. 1)) occur, the Mapper block 34 inserts unused information into the corresponding position of the payload container 10. Using the FIFO fill example described above, when the FIFO 30 signals a high indication, the Mapper block 34 sets the next available justification control position to indicate that the following justification data position contains client data, generates a pulse on the Read Clock 32 to clock data out of the FIFO 30, and inserts client data into that justification data position. If the Fill Status 36 does not signal a high indication, the Mapper block 34 sets the next available justification control position to indicate that the following justification data position contains unused data, does not clock any data out of the FIFO 30, and does not insert client data into that justification data position.

The justification process may be extended to support multiple FIFO fill status levels that control the insertion of multiple units of client or unused data into multiple justification data positions. For example, four justification data positions may be allocated for each justification control operation where 0, 2, or 4 positions are used for client data depending upon three different FIFO fill ranges.

Figure 3:
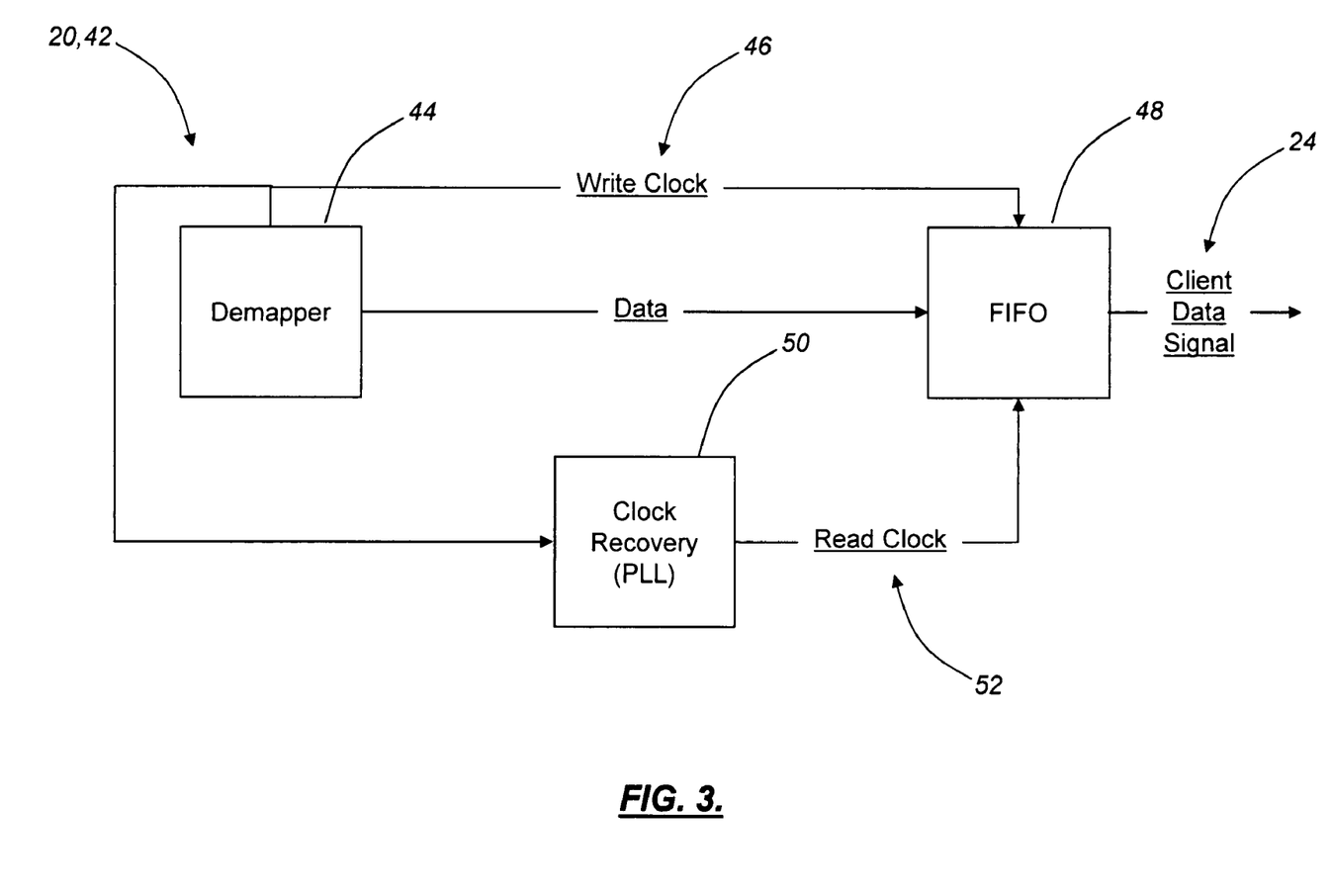
FIG. 3 is a schematic diagram illustrating one exemplary embodiment of the egress end of the telecommunications transport system of the present invention, the egress end including a Demapper block, a first in, first-out (FIFO) storage element, a Clock Recover block, a Write Clock, and a Read Clock.

Referring to FIG. 3, at the egress end 42 of the transport system the client data signal 24 is recovered. The Demapper block 44 interprets the information in the payload container 10 (FIG. 1), outputs the client data, and generates a Write Clock 46 that is used to clock data into a FIFO 48 that is generated by gapping the payload container clock. When a client data position (a D position of Segment 1 12 (FIG. 1))

occurs in the payload container, the Demapper block 44 outputs the data and generates a pulse on the Write Clock 46 to clock the data into the FIFO 48. When a fixed stuff position (an S position of Segment 2 14 (FIG. 1)) occurs in the payload container, the Demapper block 44 outputs nothing and does not generate a pulse on the Write Clock 46. When a justification control position (a C position of Segment 4 18 (FIG. 1)) occurs in the payload container and the justification control information indicates that following justification data position contains client data, the Demapper block 44 outputs the data in the following justification data position and generates a pulse on the Write Clock 46 to clock the data into the FIFO 48. When a justification control position occurs in the payload container and the justification control information indicates that the following justification data position contains unused data, the Demapper block 44 outputs nothing and does not generate a pulse on the Write Clock 46. In either case, no Write Clock 46 is generated and no data is output for the justification control position.

The Write Clock 46 from the Demapper block 44 also drives a Clock Recovery block 50. The Clock Recovery block 50 is essentially a phase-locked loop that generates a periodic output clock from the gapped input of the Write Clock 46. The output clock is used as a Read Clock 52 for the FIFO 48, which causes the client data to be clocked out of the FIFO 48 at a regular rate, the same rate that the client data was clocked into the FIFO 30 (FIG. 2) in the Mapper block 34 (FIG. 2).

Figure 4:
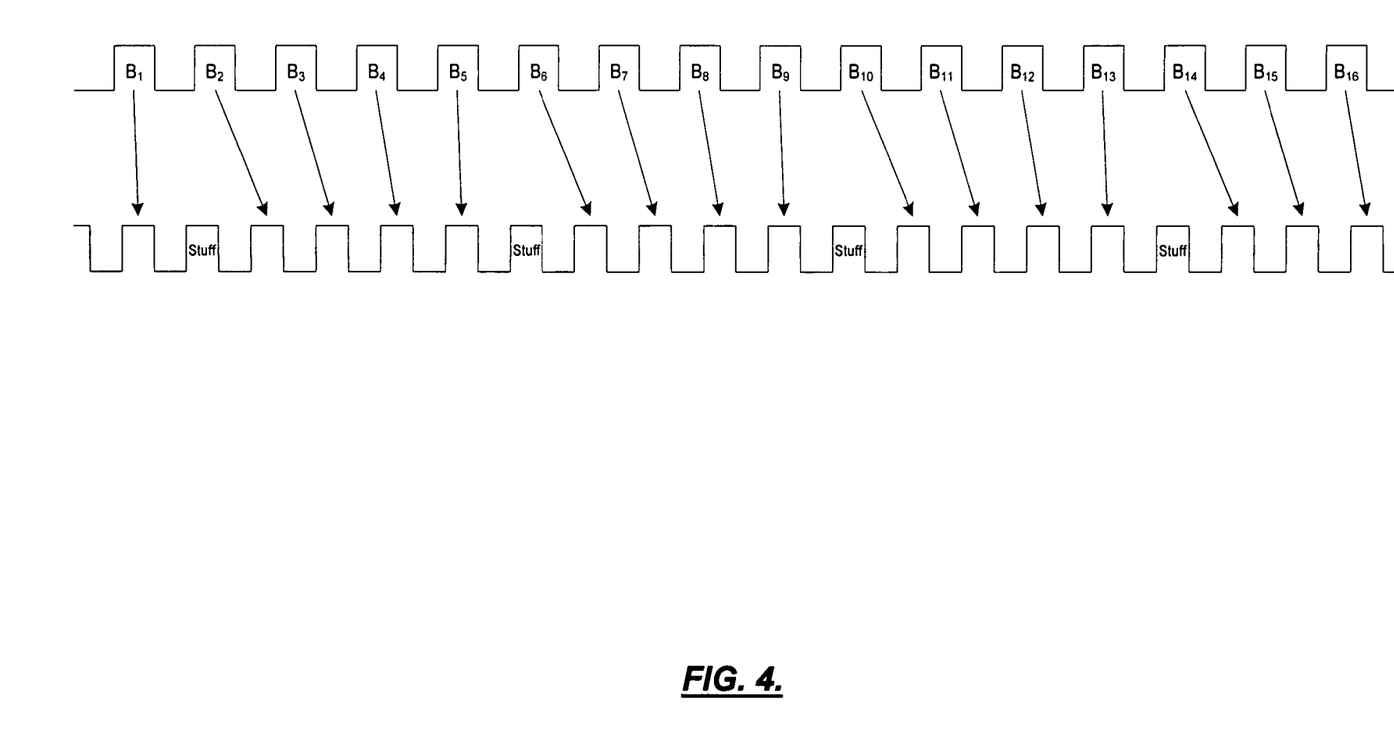
FIG. 4 is a schematic diagram illustrating a fixed-rate rate-adaptation technique that utilizes stuffing.
Figure 5:
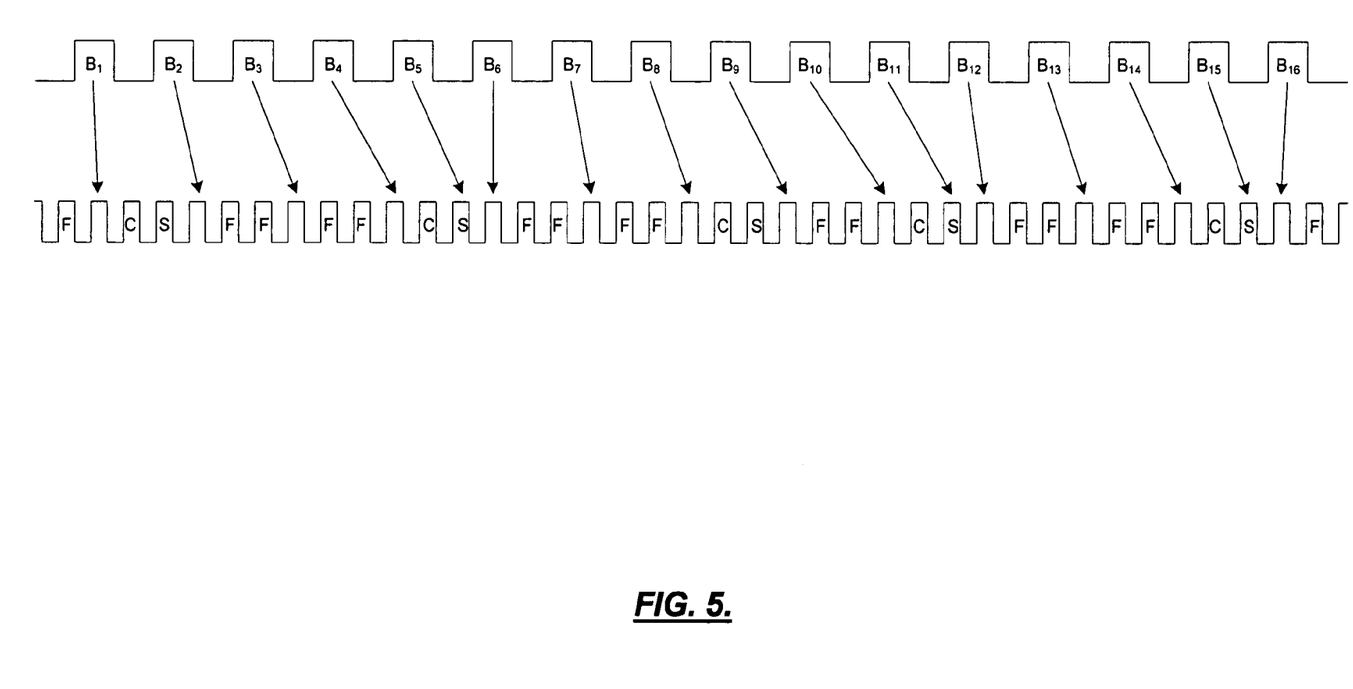
FIG. 5 is a schematic diagram illustrating the Mapper functions of a rate-adaptation technique using fixed stuff (F positions), variable stuff (S positions), and stuffing control (C positions)
Figure 6:
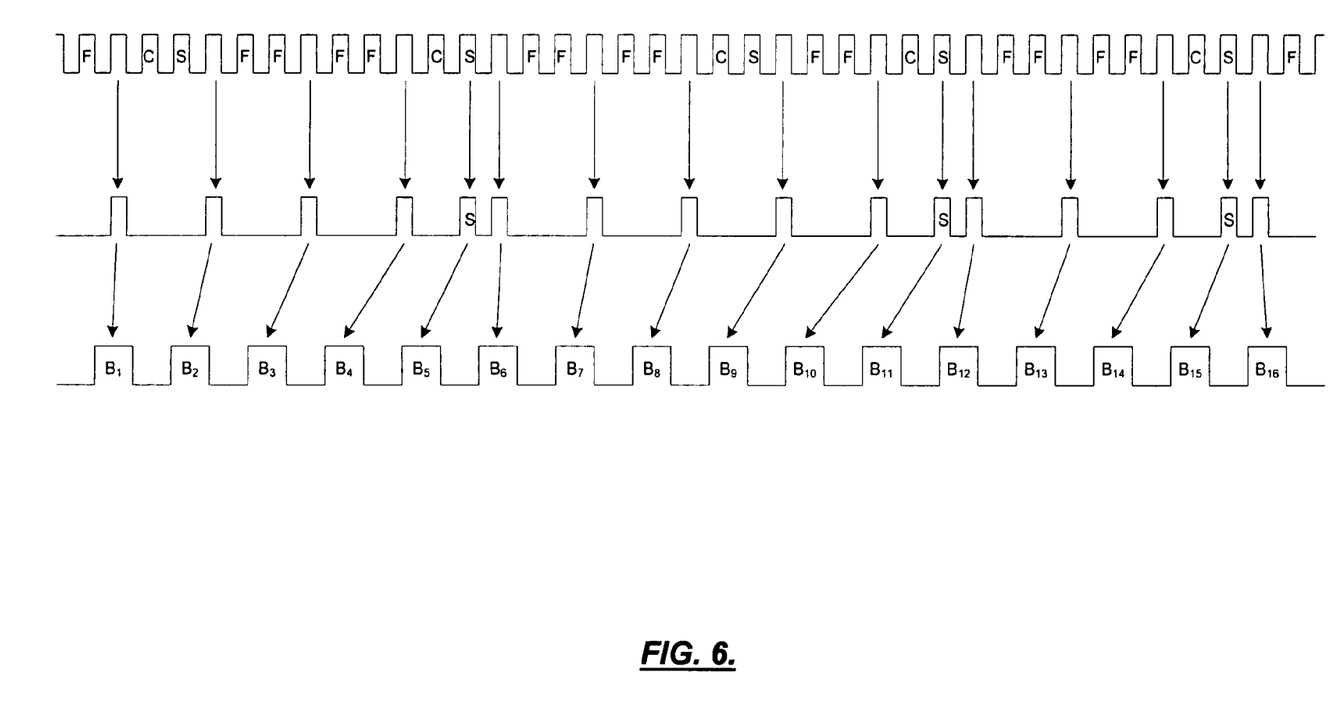
FIG. 6 is a schematic diagram illustrating one exemplary embodiment of the bit-transparent demapping clock and data recovery technique of the present invention.

FIGS. 4-6 illustrate, in a conceptual manner, a fixed-rate rate-adaptation technique that utilizes stuffing (FIG. 4); a rate-adaptation technique using fixed stuff (F positions), variable stuff (S positions), and stuffing control (C positions) (FIG. 5); and the bit-transparent mapping/demapping clock and data recovery technique of the present invention (FIG. 6). This technique includes the dropping of fixed stuff, the interpretation of control information to determine valid stuff data, the dropping of control and invalid stuff positions, the processing of the remaining gapped data signal through a phase-locked loop, and recovering a signal that is identical to the incoming data stream.

Using the above methods and systems, the ingress to egress transport process provides for the transparent transport of all bits of the client data signal 24 (FIGS. 2 and 3), recovering the timing of that client data signal at egress and thereby eliminating the need to perform rate adaptation through idle character insertion/deletion. Additionally, the mapping process may be made to essentially eliminate error multiplication. Because the only means for error multiplication using these methods and systems occur when the justification control information contains errors causing the incorrect interpretation of the justification data, the justification control information may be made redundant or contain error correction capability to minimize the contribution of any error. In this manner, a single bit error that occurs in the payload container during transport translates to, at most, a single bit error in the output client data stream.

Although the present invention has been illustrated and described herein with reference to preferred embodiments and specific examples thereof, it should be understood that other embodiments and examples may perform similar functions and/or achieve like results. All such equivalent embodiments and examples are within the spirit and scope of the present invention and are intended to be covered by the following claims.

What is claimed is:

1. A telecommunications transport method for the transparent mapping/demapping of client data signals using one of Synchronous Optical Network (SONET), Synchronous Digital Hierarchy (SDH), and Optical Transport Network (OTN), comprising:
    using a mapper, mapping an incoming client data signal to and, using a demapper, demapping an outgoing client data signal from a transport frame, the transport frame comprising one of a Synchronous Optical Network (SONET), Synchronous Digital Hierarchy (SDH), and Optical Transport Network (OTN) transport frame, and a unitary payload portion of the transport frame comprising:
        a first segment of the payload portion that is dedicated to client data;
        a second segment of the payload portion that is dedicated to fixed stuff;
        a third segment of the payload portion that is dedicated to justification data for supporting a client data signal rate adaptation function; and
        a fourth segment of the payload portion that is dedicated to justification control information for indicating whether the third segment is used for client data or fixed stuff;
    wherein the configuration and distribution of each of the plurality of segments within the payload portion of the transport frame varies based on the content of the incoming client data signal;
    wherein the transport frame has a fixed size and the mapping/demapping is performed without the insertion/deletion of idle characters for client data signal rate adaptation; and
    transporting the transport frame directly over one of a Synchronous Optical Network (SONET), Synchronous Digital Hierarchy (SDH), and Optical Transport Network (OTN) telecommunications transport network.

2. The method of claim 1, wherein the relative sizes of the first segment that is dedicated to client data and the second segment that is dedicated to fixed stuff are dependent upon the ratio of a nominal client data rate and a nominal container data rate.

3. The method of claim 1, wherein the relative size of the third segment that is dedicated to justification data is dependent upon relative variations of a client data rate and a container data rate due to clock tolerances and clock frequency drift.

4. The method of claim 1, wherein the relative size of the fourth segment that is dedicated to justification control information is dependent upon the amount of information that is required to control the choice of client data or fixed stuff for the third segment.

5. A telecommunications transport method for the transparent mapping/demapping of client data signals using one of Synchronous Optical Network (SONET), Synchronous Digital Hierarchy (SDH), and Optical Transport Network (OTN), comprising:
    using a mapper, mapping an incoming client data signal to and, using a demapper, demapping an outgoing client data signal from a transport frame, the transport frame comprising one of a Synchronous Optical Network (SONET), Synchronous Digital Hierarchy (SDH), and Optical Transport Network (OTN) transport frame, and a unitary payload portion of the transport frame comprising:
        a first segment of the payload portion that is dedicated to client data;
        a second segment of the payload portion that is dedicated to fixed stuff;

wherein the fixed stuff comprises network management information;

a third segment of the payload portion that is dedicated to justification data for supporting a client data signal rate adaptation function; and a fourth segment of the payload portion that is dedicated to justification control information for indicating whether the third segment is used for client data or fixed stuff, wherein the justification control information is redundant for error protection purposes;

wherein the configuration and distribution of each of the plurality of segments within the payload portion of the transport frame varies based on the content of the incoming client data signal;

wherein the transport frame has a fixed size and the mapping/demapping is performed without the insertion/deletion of idle characters for client data signal rate adaptation; and transporting the transport frame directly over one of a Synchronous Optical Network (SONET), Synchronous Digital Hierarchy (SDH), and Optical Transport Network (OTN) telecommunications transport network.

6. The method of claim 5, wherein the relative sizes of the first segment that is dedicated to client data and the second segment that is dedicated to fixed stuff are dependent upon the ratio of a nominal client data rate and a nominal container data rate.

7. The method of claim 5, wherein the relative size of the third segment that is dedicated to justification data is dependent upon relative variations of a client data rate and a container data rate due to clock tolerances and clock frequency drift.

8. The method of claim 5, wherein the relative size of the fourth segment that is dedicated to justification control information is dependent upon the amount of information that is required to control the choice of client data or fixed stuff for the third segment.

9. An optical networking communication method, comprising:

on one of a Synchronous Optical Network (SONET), Synchronous Digital Hierarchy (SDH), and Optical Transport Network (OTN) link, using a mapper to map an incoming client data signal to and, using a demapper to demap an outgoing client data signal from a transport frame, the transport frame comprising one of a SONET, SDH, or OTN transport frame, and a unitary payload portion of the transport frame comprising:

a first segment of the payload portion that is dedicated to client data;

a second segment of the payload portion that is dedicated to fixed stuff;

a third segment of the payload portion that is dedicated to justification data for supporting a client data signal rate adaptation function; and a fourth segment of the payload portion that is dedicated to justification control information for indicating whether the third segment is used for client data or fixed stuff;

wherein the configuration and distribution of each of the plurality of segments within the payload portion of the transport frame varies based on the content of the incoming client data signal;

wherein the transport frame has a fixed size and the mapping/demapping is performed without the insertion/deletion of idle characters for client data signal rate adaptation; and transporting the transport frame directly over the SONET, SDH, or OTN link.

10. The optical networking communication method of claim 9, wherein the relative sizes of the first segment that is dedicated to client data and the second segment that is dedicated to fixed stuff are dependent upon the ratio of a nominal client data rate and a nominal container data rate.

11. The optical networking communication method of claim 9, wherein the relative size of the third segment that is dedicated to justification data is dependent upon relative variations of a client data rate and a container data rate due to clock tolerances and clock frequency drift.

12. The optical networking communication method of claim 9, wherein the relative size of the fourth segment that is dedicated to justification control information is dependent upon the amount of information that is required to control the choice of client data or fixed stuff for the third segment.

13. The optical networking communication method of claim 9, wherein using the mapper and using the demapper comprises:

using the mapper to transparently map the incoming client data signal to and, using the demapper to transparently demap the outgoing client data signal from the transport frame.

14. The method of claim 1, wherein using the mapper and using the demapper comprises transparently mapping the incoming client data signal to, and transparently demapping the outgoing client data signal from the transport frame.

15. The method of claim 5, wherein using the mapper and using the demapper comprises transparently mapping the incoming client data signal to, and transparently demapping the outgoing client data signal from the transport frame.

* * * * *